United States Patent
Wilcox

Patent Number: 5,337,782
Date of Patent: Aug. 16, 1994

[54] HYDRAULIC COUPLING

[75] Inventor: Wayne Wilcox, Waterford, Pa.

[73] Assignee: Snap-Tite, Inc., Union City, Pa.

[21] Appl. No.: 2,624

[22] Filed: Jan. 11, 1993

[51] Int. Cl.⁵ ............................................. F16L 37/28
[52] U.S. Cl. ........................ 137/614.03; 251/149.6; 137/596.2
[58] Field of Search ............... 137/614.04, 614.05, 137/614.02, 614.03, 614, 596.2, 107; 251/149.6

[56] References Cited

U.S. PATENT DOCUMENTS

| | | | |
|---|---|---|---|
| 3,097,867 | 7/1963 | Saloum | 137/614.03 X |
| 3,414,017 | 12/1968 | Hodgson | 137/596.2 |
| 3,417,781 | 12/1968 | Gregg | 137/614.04 |
| 3,646,964 | 3/1972 | Stratman | 137/614.03 |
| 3,792,715 | 2/1974 | Parrett et al. | 137/596.2 X |
| 4,086,939 | 5/1978 | Wilcox et al. | 137/614.03 |
| 4,433,615 | 2/1984 | Vick | 137/596.2 X |
| 4,924,909 | 5/1990 | Wilcox | 137/614.05 |

Primary Examiner—Martin P. Schwadron
Assistant Examiner—Kevin L. Lee
Attorney, Agent, or Firm—Woodling, Krost & Rust

[57] ABSTRACT

A hydraulic coupler half simple enough for use in miniature couplings is disclosed. Both the relief ports and the main fluid ports are in the pintle. The relief ports are uncovered by a hyperextension of the pintle; the main fluid ports are uncovered by retraction of a sliding sleeve around the pintle. The pintle has a single annular contact point with the coupler body and clearances between the walls so that exact alignment is not necessary for connection. The nipple half is conventional.

4 Claims, 4 Drawing Sheets

HYDRAULIC COUPLING

This invention relates to devices for joining together sections of fluid-handling systems. In particular, it relates to miniature couplings for environments such as electronic cooling systems, and to relief valves for such couplings.

BACKGROUND OF THE INVENTION

In some high-reliability computer applications, and in various other situations, small hydraulic cooling systems are used. The couplings for such systems should be of the "no-spill" type—that is, no fluid should be lost when they are disconnected—but they may typically have diameters of only one-half inch or less. Their small size presents special design problems, foremost among which is that a greater simplicity than usual is required for the manufacture and assembly of couplings with many tiny parts is obviously time and labor consuming.

Yet these couplings must often have design features found in full-size devices. For example, hydraulic cooling systems for computers may incorporate so-called "cold plates", flat panels of thin metal for heat exchange in the coolant. Since they are subject to rupture when excessive heat causes pressure buildup, it is desirable to provide a relief valve in the coupler half. The usual relief valve arrangement, however, involves a separate popper valve and spring, together with various small retainers and seals. A need therefore exists for a simpler design which minimizes the number of extra parts required for the relief valve. It is also an advantage if the coupling can be connected even when the halves are presented to each other not exactly aligned.

SUMMARY OF THE INVENTION

In the present invention, the coupling is of the no-spill type with an outer body surrounding each of the coupler and nipple halves. In the usual arrangement, a pintle in the coupler half and a corresponding nipple valve in the nipple half are extended forward by springs. When the two halves are joined, the coupler body and nipple body abutting at their forward ends, both springs are compressed, retracting the coupler and nipple valves and opening a flow path between the halves.

It is desirable to provide a relief valve for systems in which high fluid pressure in the disconnected mode presents some hazard. This invention provides the relief function without a separate relief valve. This is achieved by making the pintle serve as a relief valve itself. Under a pressure excess in the uncoupled mode, it extends beyond its normally extended position to open a flow path. In the coupled mode, it is not retracted; only a single sliding sleeve is retracted. The coupler half has only three major components. It also has the capability of connection even when radially or angularly misaligned with respect to the nipple half.

Thus, it is an object of this invention to provide a hydraulic no-spill coupling of great simplicity.

Another object of the invention is to provide such a coupling which has a relief valve in its coupler half.

A further object of the invention is to provide such a coupling with a misalignment capability.

These and other objects and aspects of the invention will be understood from the following description of a preferred embodiment of the invention and the claims appended hereto, along with the accompanying drawings.

BRIEF DESCRIPTION OF THE DRAWINGS

For a better understanding of the invention, reference should be made to the drawings forming part of this specification, in which.

DETAILED DESCRIPTION OF A PREFERRED EMBODIMENT

Figure 1:
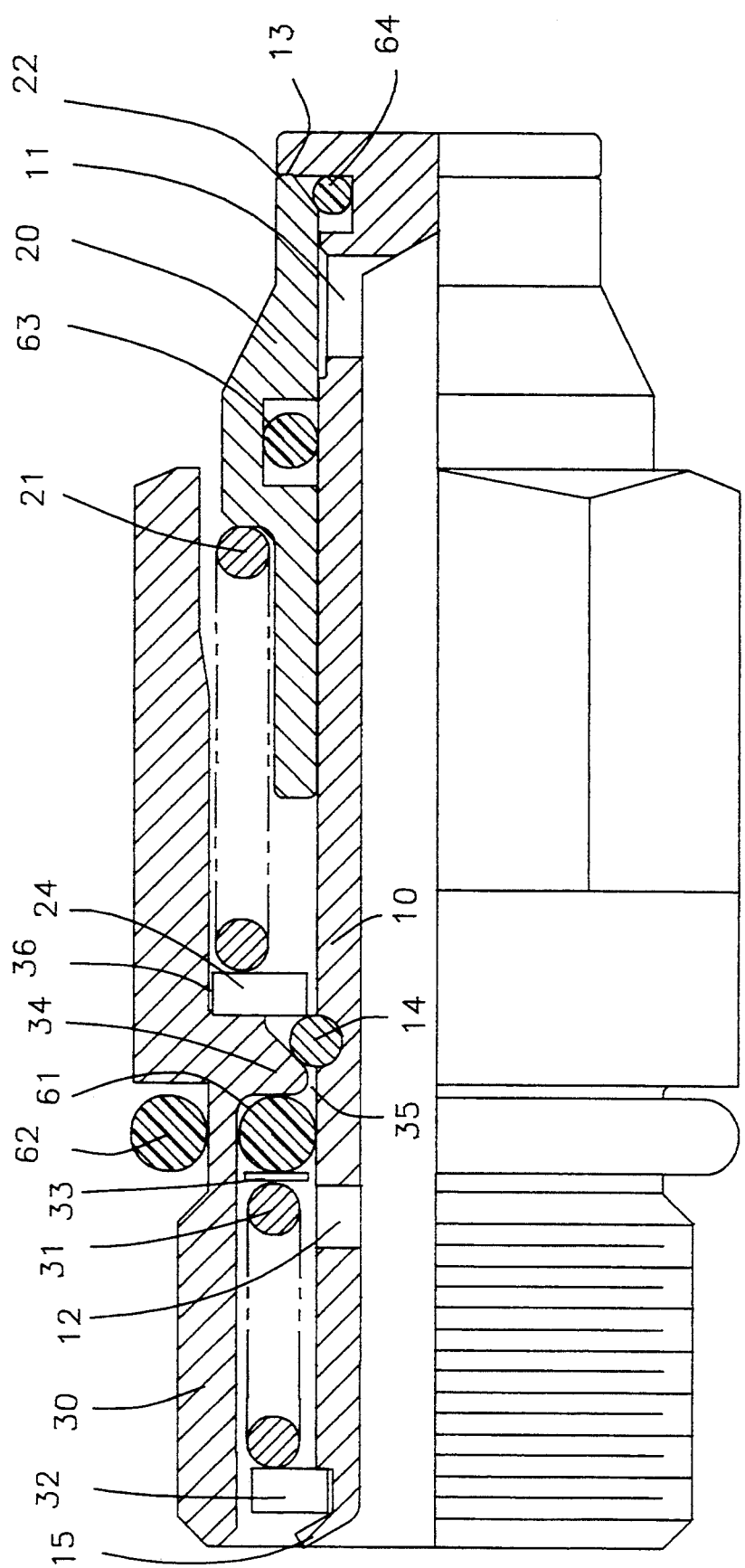
FIG. 1 is a cross-sectional view, taken parallel to and in the plane of the central axis, of the coupler half of a preferred embodiment of the invention.

The coupler half of a presently preferred embodiment of the invention is seen in FIG. 1. The innermost component is a cylindrical pintle 10. A number of pintle ports 11 are arranged radially around the central axis near the outside end of pintle 10. Similarly, there are relief ports 12, also radially arranged, near the inside end of pintle 10.

A sliding sleeve 20 surrounds the pintle 10 in a region over pintle ports 11. Sleeve 20 is urged outwardly by a sleeve spring 21. At the outward end 22 of sleeve 20, its outward extension is limited by abutment with an outer pintle shoulder 13. Sleeve spring 21 is supported at its inner end by a sleeve spring washer 24, which by abutment with a snap ring 14 fitted into a groove in pintle 10 between ports 11 and 12, permits sleeve spring 21 to exert its action upon sleeve 20 independently of the position of the coupler body, and insures that sleeve spring 21 remains under compression.

The outermost major component of the coupler half is coupler body 30. Generally cylindrical, it accommodates in its outer portion the components described in the preceding paragraph. Between its inner portion and the part of pintle 10 containing relief ports 12 is a relief spring 31, which urges pintle 10 inwardly, that is, retracts it with respect to coupler body 30. Relief spring 31 acts upon pintle 10 at the inner end through a pintle spring washer 32 and inner pintle shoulder 15. It is supported at its outer end by an O-ring washer 33, and an O-ring 61 which abuts a downwardly extending projection 34 on coupler body 30. The other side of projection 34 abuts snap ring 14 as pintle 10 is urged inwardly by relief spring 31, and this abutment limits the retraction of pintle 10. As will be seen in the drawings, there are a first gap 35 between projection 34 and pintle 10, and a second gap 36 between sleeve spring washer 24 and coupler body 30.

Besides serving as an abutment point limiting the retraction of pintle 10, snap ring 14 has another important function. As will be seen in FIG. 1, snap ring 14 is the only point of metal contact between pintle 10 and coupler body 30. Pintle 10 and sleeve 20 are thus permitted a slight movement out of alignment with the coupler body 30, so that if the coupler and nipple halves are slightly misaligned, reconnection may still be effected.

In addition to first O-ring 61, which seals between pintle 10 and coupler body 30 when pintle 10 is in its normal extension, the coupler half has a second O-ring 62, sealing the coupler body in the mounting member, and third and fourth O-rings 63 and 64 sealing between pintle 10 and sleeve 20 while the coupler is disconnected.

Figure 2:
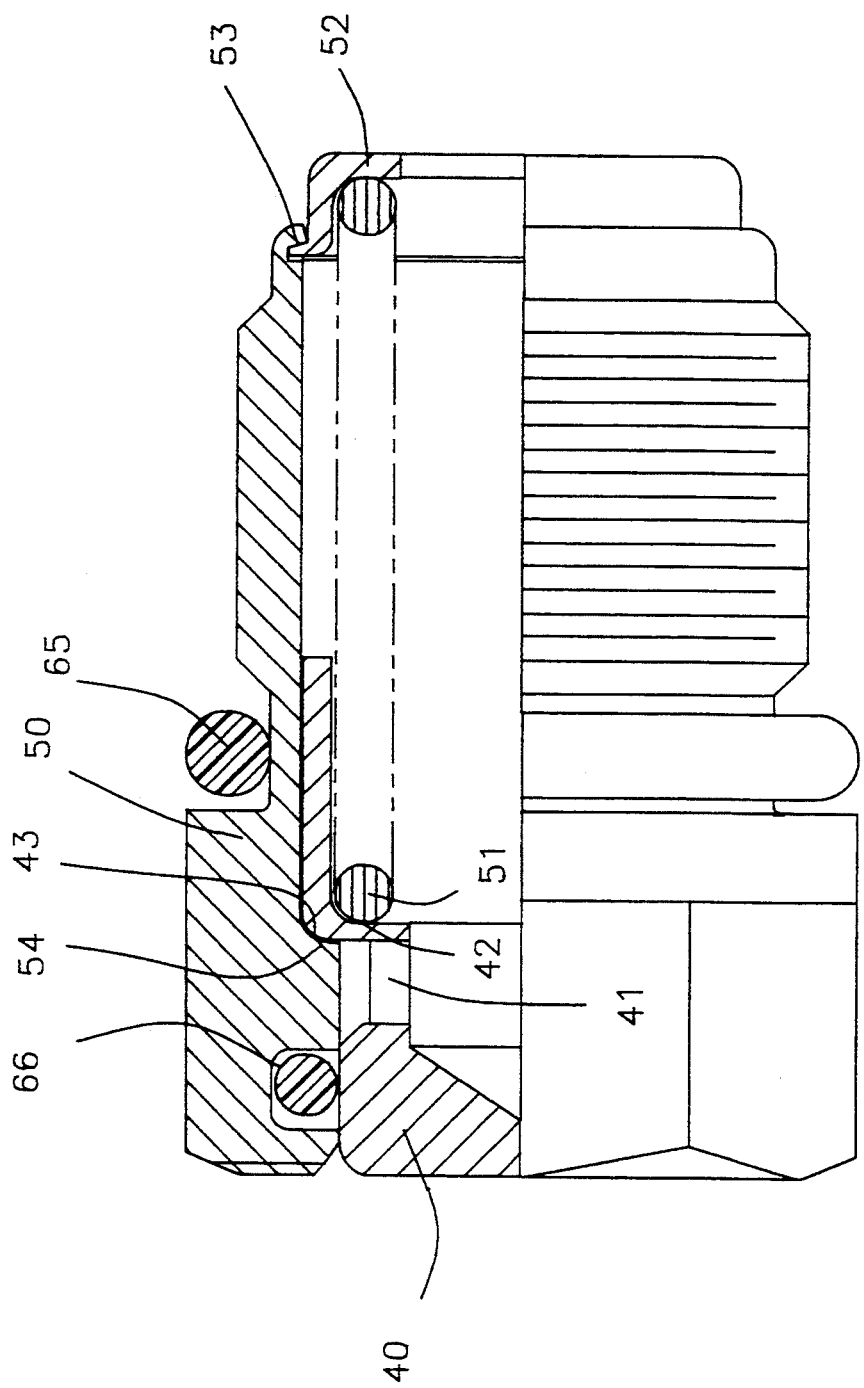
FIG. 2 is a similar view of the nipple half.

The nipple half of the coupling is best seen in FIG. 2. Its innermost component is a nipple valve 40, which is a cylinder closed at its outside end except for radial nipple ports 41. A nipple body 50 surrounds nipple valve 40. Valve 40 is urged outward with respect to body 50 by a nipple spring 51 which acts upon valve 40 at nipple spring shoulder 42, and is supported at its inner end by a spring retainer 52 abutting a first nipple body shoulder 53. The outward extension of nipple valve 40 with respect to body 50 is limited by the abutment of a nipple valve shoulder 43 against a second nipple body shoulder 54.

The nipple half has a fifth O-ring 65, sealing the nipple body in its mounting member, and a sixth O-ring 66, sealing between nipple valve 40 and nipple body 50 while the coupling is disconnected.

Figure 3:
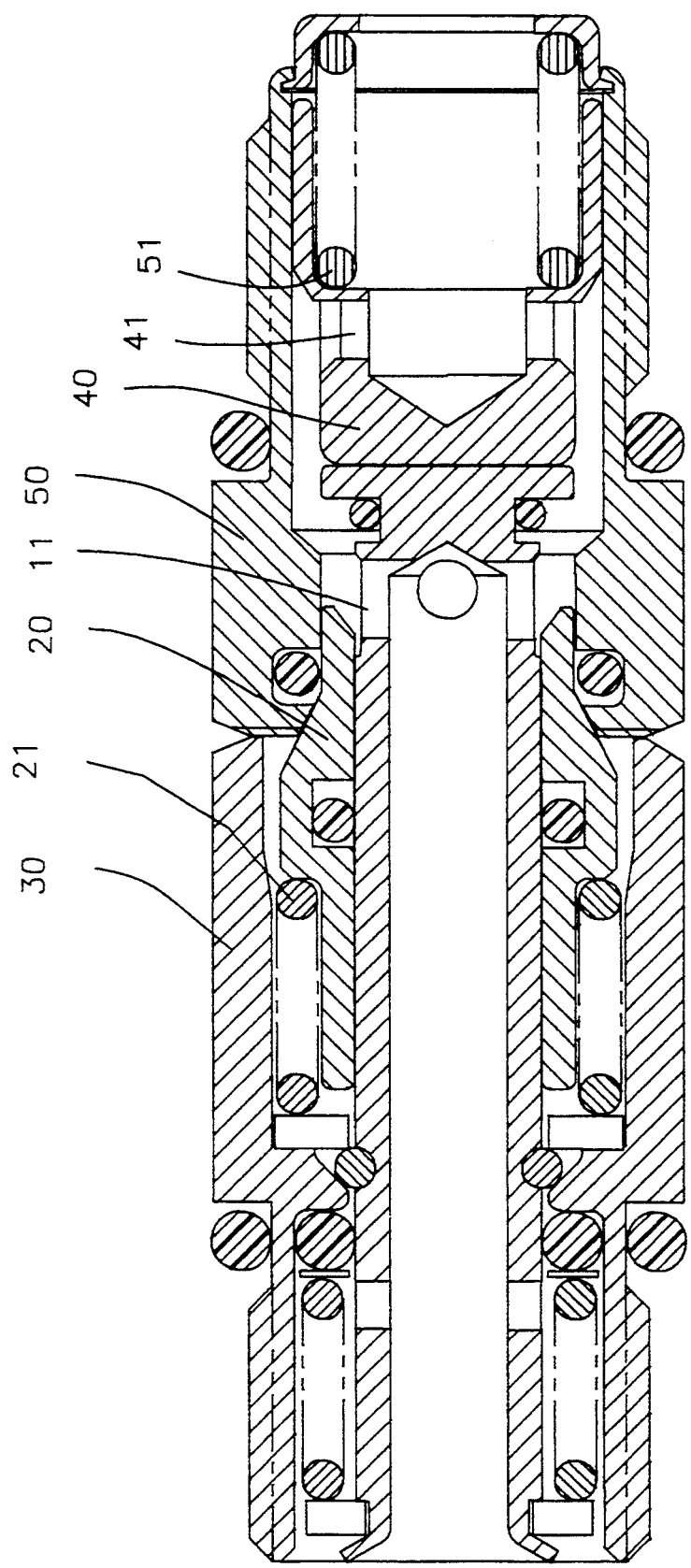
FIG. 3 is a similar view of both halves of the preferred embodiment in the connected mode.

FIG. 3 shows the connected coupling. It will be seen that the abutment of coupler body 30 and nipple body 50 has brought about a compression of both sleeve spring 21 and nipple spring 51, causing the retraction of sliding sleeve 20 and nipple valve 40 and opening pintle ports 11 and nipple ports 41, which then communicate with each other to permit fluid flow.

Figure 4:
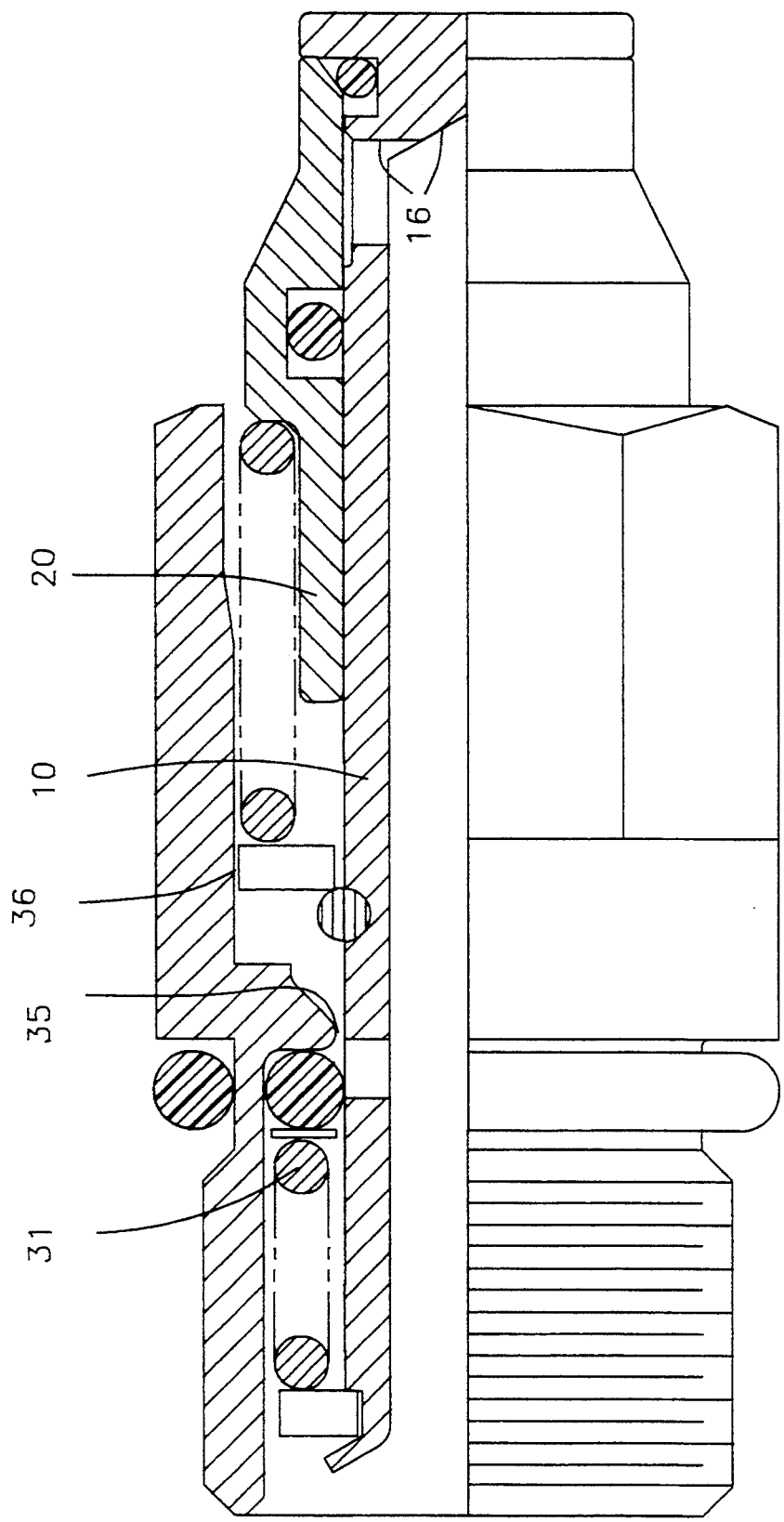
FIG. 4 is a similar view of a coupler half showing the relief valve function in operation.

In FIG. 4 the relief mode is seen. The characteristics of relief spring 31, selected according to criteria well known to those in the art, permit the spring to be compressed when the internal fluid pressure, acting upon pintle wall 16, exceeds some desired predetermined value. Upon sufficient compression, pintle 10, sleeve 20 and their related components have been hyperextended to expose the relief ports 12 to the outside via gaps 35 and 36.

The foregoing description of a preferred embodiment illustrates the principles of the invention, but numerous modifications and equivalents, falling within the scope of the invention as claimed, will be apparent to those of skill in the art.

What is claimed is:

1. A coupler half comprising
   a coupler body,
   a pintle having a first position with resect to said coupler body, said pintle having a relief port not communicating with the outside when said pintle is in its said first position, but said pintle being axially extendable against a relief spring to a second position in which said relief port communicates with the outside, and said pintle having a pintle port, and
   a sleeve covering said pintle port, said sleeve being retractable with respect to said pintle against a sleeve spring to a retracted position in which said pintle port is uncovered.

2. An improved no-spill coupling comprising the coupler half of claim 1 and a nipple half, said nipple half comprising
   a nipple body, and
   a nipple valve having a nipple port covered by said nipple body, said nipple valve being retractable with respect to said nipple body against a nipple spring to a retracted position in which said nipple port is uncovered;
   and said coupler half and nipple half having wall means coacting to retract said sleeve and said nipple valve to their said retracted positions when said coupler is connected.

3. The improved coupler half of claim 1 and further comprising contact means between said pintle and said coupler body,
   and in which said coupler body and said pintle contact each other only through said contact means between them, said means thus permitting axial mialignment of said coupler body and said pintle.

4. The improved coupler half of claim 3 and in which said contact means comprises ring means which further serve to support said sleeve spring with respect to said pintle in a position independent of said coupler body.

* * * * *